United States Patent
Alkhrdaji

(10) Patent No.: US 11,402,287 B2
(45) Date of Patent: Aug. 2, 2022

(54) MECHANICAL FORMWORK PRESSURE SENSOR FOR IN-SITU MEASUREMENT OF FLUID PRESSURE DURING CONCRETE MATERTAL PLACEMENT AND METHOD OF USING THE SAME

(71) Applicant: Structural Group, Inc., Columbia, MD (US)

(72) Inventor: Tarek Alkhrdaji, Ellicott City, MD (US)

(73) Assignee: STRUCTURAL GROUP, INC., Columbia, MD (US)

(*) Notice: Subject to any disclaimer, the term of this patent is extended or adjusted under 35 U.S.C. 154(b) by 0 days.

(21) Appl. No.: 17/017,188

(22) Filed: Sep. 10, 2020

(65) Prior Publication Data
US 2021/0072104 A1 Mar. 11, 2021

Related U.S. Application Data

(60) Provisional application No. 62/898,135, filed on Sep. 10, 2019.

(51) Int. Cl.
*G01L 7/16* (2006.01)
*G01L 11/00* (2006.01)
*G01L 19/14* (2006.01)

(52) U.S. Cl.
CPC .............. *G01L 7/166* (2013.01); *G01L 7/163* (2013.01); *G01L 11/004* (2013.01); *G01L 19/141* (2013.01)

(58) Field of Classification Search
CPC . G01L 7/16; G01L 7/163; G01L 7/166; G01L 9/0089
See application file for complete search history.

(56) References Cited

U.S. PATENT DOCUMENTS

| | | | | |
|---|---|---|---|---|
| 927,298 A * | 7/1909 | Twitchell | ................. | G01L 7/16 73/744 |
| 1,306,245 A * | 6/1919 | Bowden | ................... | G01L 7/16 73/744 |

(Continued)

FOREIGN PATENT DOCUMENTS

| | | | | |
|---|---|---|---|---|
| CN | 203929289 | | 11/2014 | |
| CN | 204101229 U * | | 1/2015 | ............... G01L 7/04 |

(Continued)

OTHER PUBLICATIONS

English Translation of KR-101534262-B1 (Year: 2015).*
(Continued)

*Primary Examiner* — Alexander A Mercado
(74) *Attorney, Agent, or Firm* — Whiteford, Taylor & Preston, LLP; Gregory M. Stone

(57) ABSTRACT

Disclosed is a method and an apparatus for measuring the pressure of fresh concrete and similar liquid materials during placement, in which a movable component is displaced under the pressure of concrete or other liquids and is used as an indicator of the pressure exerted by the concrete or liquid material on the device. Mechanical resistance of the movable component is achieved using a calibrated spring or similar mechanical resistance element. The movable part consists of a pressure plate attached to a scaled cylindrical core, calibrated to provide measurements of the external concrete or liquid pressure. The movable component and mechanical resistance element are installed in a casing with flanges to attach the apparatus to the formwork or vessel.

20 Claims, 2 Drawing Sheets

(56) References Cited

U.S. PATENT DOCUMENTS

| | | | | |
|---|---|---|---|---|
| 1,352,697 | A | * | 9/1920 | Schweinert ............ G01L 7/16 73/731 |
| 1,631,714 | A | * | 6/1927 | Wellman ............... G01L 7/16 73/744 |
| 2,038,928 | A | | 4/1936 | Farley et al. |
| 2,576,687 | A | * | 11/1951 | Krehbiel ............... G01L 7/16 73/714 |
| 3,596,521 | A | * | 8/1971 | Guy ..................... G01L 7/16 73/744 |
| 3,677,089 | A | | 7/1972 | Martin |
| 3,789,669 | A | * | 2/1974 | Passman ............... G01L 7/16 73/744 |
| 3,910,120 | A | * | 10/1975 | Martin .................. G01L 7/16 73/744 |
| 3,975,959 | A | * | 8/1976 | Larkin .................. G01L 7/166 73/744 |
| 4,136,560 | A | | 1/1979 | Gellos |
| 4,168,621 | A | * | 9/1979 | Kreitenberg ............ G01M 3/26 138/90 |
| 4,222,276 | A | * | 9/1980 | DeRogatis ........ B65D 81/2038 73/714 |
| 4,246,798 | A | | 1/1981 | Myles |
| 4,777,828 | A | * | 10/1988 | Ferris ................... G01L 7/16 116/272 |
| 5,606,131 | A | | 2/1997 | Pope |
| 6,164,139 | A | * | 12/2000 | Krimmer .............. G01L 7/166 73/146.8 |
| 8,616,066 | B2 | | 12/2013 | Sprenger et al. |
| 9,016,109 | B1 | * | 4/2015 | Miguez ................ G01L 7/166 73/40 |
| 9,097,637 | B2 | | 8/2015 | Pagani et al. |
| 9,304,052 | B2 | | 4/2016 | Chou |
| 9,459,192 | B2 | | 10/2016 | Hosoda et al. |
| 9,791,303 | B2 | | 10/2017 | Pagani et al. |
| 9,945,229 | B2 | | 4/2018 | Kern |
| 10,324,078 | B2 | | 6/2019 | Ghods et al. |
| 2006/0231013 | A1 | * | 10/2006 | Lane .................... G01L 7/166 116/272 |
| 2013/0342186 | A1 | | 12/2013 | Pagani et al. |
| 2014/0013833 | A1 | | 1/2014 | Hosoda |
| 2015/0135846 | A1 | | 5/2015 | Pagani et al. |
| 2017/0254202 | A1 | | 9/2017 | Kern |
| 2017/0370898 | A1 | | 12/2017 | Radjy et al. |
| 2019/0107455 | A1 | * | 4/2019 | Wortman ............... G01L 7/166 |

FOREIGN PATENT DOCUMENTS

| | | | |
|---|---|---|---|
| CN | 204556049 | | 8/2015 |
| EP | 3404205 A1 | * 11/2018 | ........... G01L 9/0089 |
| GB | 2102351 A | * 2/1983 | ............... G01L 7/16 |
| JP | 3933546 | | 6/2007 |
| JP | 2009127230 | | 6/2009 |
| KR | 101534262 B1 | * 7/2015 | |
| KR | 20150123584 | | 11/2015 |
| KR | 101902626 | | 10/2018 |

OTHER PUBLICATIONS

English Translation of EP-3404205-A1 (Year: 2018).*

English Translation of CN-204101229-U (Year: 2015).*

ConForms. Conforms Pressure Gauge. Retrieved on Sep. 13, 2019 from: https://conforms.com/products/boom-truck-systems/con-forms-pressure-gauge/.

Liquip. Schultz Differential Pressure Gauges. Retrieved on Sep. 13, 2019 from: https://www.liquip.com/products/aviation/filtration-fuel-sampling/gauges/schultz-differential-pressure-gauges.

* cited by examiner

MECHANICAL FORMWORK PRESSURE SENSOR FOR IN-SITU MEASUREMENT OF FLUID PRESSURE DURING CONCRETE MATERTAL PLACEMENT AND METHOD OF USING THE SAME

CROSS REFERENCE TO RELATED APPLICATIONS

This application is based upon and claims the benefit of U.S. Provisional Application No. 62/898,135 titled "Mechanical Formwork Pressure Sensor for In-Situ Measurement of Fluid Pressure During Concrete Material Placement and Method of Using the Same," filed with the United States Patent & Trademark Office on Sep. 10, 2019, the specification of which is incorporated herein by reference in its entirety.

FIELD OF THE INVENTION

This invention relates generally to systems, methods, and apparatus for measuring the pressure of concrete during fluid concrete placement in formwork.

BACKGROUND

Construction of concrete structures is often carried out using forms that contain the freshly poured, liquid concrete in order to cast the intended structure in place. Such forms, or more particularly "formwork," are typically used to cast a variety of vertical concrete structures, such as walls, columns, and the like. However, a challenge exists in the construction of such vertical concrete structures inside of formwork, as the liquid concrete generates significant hydrostatic pressure, in turn creating high lateral pressures on the vertical form intended to contain and properly shape the vertical structure as the concrete cures. The failure of such formwork to properly contain the concrete as it cures can be catastrophic to the construction process. Thus, it can be quite critical to ensure that the hydrostatic pressures exerted by the concrete on the formwork as it cures does not exceed the structural capabilities of the formwork to contain the concrete during the curing process.

Specifically, with an unknown concrete mix behavior and the resulting material pressure, the formwork design and pressure during concrete material placement can vary significantly throughout the structure, and can in fact be as high as full liquid head. If the theoretical design pressure of the formwork is exceeded, localized or complete failure of the formwork may occur. To ensure that the design pressure has not been exceeded, and to ensure the safety of workers, the concrete pressure inside of the formwork during placement should preferably be monitored on-site, ideally using a rugged but simple device that is easy to use without specialized training.

Unfortunately and too often, formwork selection and design must be completed before the concrete mix design has been established. Without knowing the behavior and type of concrete to be used, designating the proper fresh or liquid concrete pressure to be used when carrying out the formwork design is often only a guess. Additionally, last minute changes to formwork design to address a differing pressure that is to be used inside of an already planned formwork can be quite costly. As such, placement pressure for concrete directly affects the economics of the construction process. Such challenges make it even more important to provide for the real-time, in-situ measurement of the hydrostatic pressure inside of the formwork as the concrete is poured and cures.

Nonetheless, simple instruments capable of measuring the actual concrete placement pressure are practically nonexistent. Sophisticated electronic sensors are available, but such electronic devices are often too delicate to be used on construction sites and to be operated by construction workers that have not been specially trained on their installation, operation and maintenance. Additionally, these electronic devices are quite expensive. Further, electronic devices require a power supply and readout devices to translate changes in voltage or electrical resistance into a meaningful pressure value, further adding to the complexity of such systems and additional elements that must be handled and installed by the construction worker. Even further, such electronic devices require frequent calibration to ensure accuracy of their measurement, likewise calling on additional expertise of the pressure sensing system operator. Additionally, many such electronic devices are simply not very accurate for the low-pressure range, which is typically encountered during concrete placement.

One example of such electronic devices include diaphragms pressure transducers, which have been used in laboratory and field research applications to measure fresh or liquid concrete pressure. However, the use of such devices has be criticized by researchers who have observed that, under the pressure of the fluid, the membrane of such diaphragm pressure transducers deforms and produces a variation in both the sensor wire resistance and the output voltage. This creates uncertainty in the accuracy of these devices for pressure measurements for concrete, which stiffens as it hardens during the curing and setting processes.

Thus, there remains a need in the art for simplified systems and methods for the in-situ measurement of fluid pressure of concrete as it is placed and cures inside of formwork structures, which is of simplistic construction so as to minimize efforts in cleaning and likelihood of being rendered inoperable due to fouling from the concrete itself, and that is of sufficiently easy operation that its installation, use, removal, and maintenance may be handled by a concrete construction team without specialized training.

SUMMARY OF THE INVENTION

Disclosed herein is a formwork pressure sensor for use with concrete formwork structures during the placement and curing of concrete, which addresses one or more of the foregoing disadvantages of previously known sensors, that is less costly, more robust, and is more appropriate for field and construction work site applications than previously known sensors.

More particularly, a method and an apparatus are provided herein for measuring the pressure of fresh concrete and similar liquid materials during placement, in which a movable component is displaced under the pressure of concrete or other liquids contained within a formwork structure, and is used as an indicator of the pressure exerted by the concrete or liquid material on the device, and thus of the pressure exerted on the formwork structure to which the pressure sensor is attached. Mechanical resistance of the movable component is achieved using a calibrated spring or similar mechanical resistance element. The movable part consists of a pressure plate attached to a scaled cylindrical core, calibrated with the biasing mechanical resistance element to provide measurements of the concrete or liquid pressure at the location of the mechanical sensor on the formwork. The movable component and mechanical resistance element are installed in a housing with flanges to attach the apparatus to the formwork or vessel into which the concrete is poured and cures.

In use, the internal pressure plate of the mechanical pressure sensor is maintained in direct contact with the curing concrete (although a layer of grease or the like may be applied to minimize the likelihood of concrete adhering to the internal pressure plate itself), with the fluid concrete filling a cylindrical, uniformly dimensioned portion of the interior of the outer sensor housing between the pressure plate and the internal, open end of the outer sensor housing. A connecting flange is positioned on the outside of the outer sensor housing for connecting the outer sensor housing to the outside of the formwork, and positioning the open, interior end of the sensor housing flush with the interior wall of the formwork. A simple visual scale is printed on the exterior end of the cylindrical core as a gauge to indicate the pressure inside of the formwork at the location of the mechanical sensor, simply by matching the fixed outer rim of a cylindrical core opening at the end of the outer sensor housing with an aligned marking on the pressure scale printed on the cylindrical core.

Importantly, the construction of the mechanical pressure sensor described herein is of significantly minimized complexity, consisting only of the outer sensor housing that attaches directly to the outside of the formwork, the internal pressure plate and cylindrical core that move inside of the sensor housing in response to pressure exerted by the concrete on the internal plate, and the spring or other mechanical biasing member that biases the plate toward the interior end of the sensor housing (i.e., towards the concrete or other liquids contained inside of the formwork). By so limiting the components and complexity of the pressure sensor, it may be readily installed by any member of the construction team, even without specialized training in pressure sensors, may be monitored by any such members of the construction team simply by looking at a visual scale on a portion of the cylindrical core that extends outward from the outer end of the sensor housing, and may be readily removed from the formwork, dismantled, cleaned, and reassembled for re-use by any such members of the construction team.

In accordance with certain aspects of an embodiment, a mechanical pressure sensor configured for in-situ measurement of fluid pressure inside of a concrete formwork panel is provided, the mechanical pressure sensor consisting essentially of: an outer sensor housing having a housing side wall having an interior side and an exterior side, a housing top wall at a first end of the housing side wall, and the housing side wall defining an open face at a second end of the housing side wall; a connecting flange on the exterior the housing side wall and configured for removable attachment of the mechanical pressure sensor to an outer face of a concrete formwork panel; a pressure plate exposed to the open face of the outer sensor housing and positioned to contact concrete within a concrete formwork panel to which the mechanical pressure sensor is attached; a biasing member biasing the pressure plate toward the open face of the outer sensor housing; a cylindrical core affixed to the pressure plate and extending through an opening in the housing top wall; and a pressure scale on the cylindrical core positioned to indicate a hydrostatic pressure of concrete inside of a concrete formwork panel to which the mechanical pressure sensor is attached.

In accordance with further aspects of an embodiment of the invention, a system for in-situ measurement of fluid pressure inside of a concrete formwork panel is provided, comprising: a mechanical pressure sensor, the mechanical pressure sensor further comprising an outer sensor housing having a housing side wall having an interior side and an exterior side, a housing top wall at a first end of the housing side wall, and the housing side wall defining an open face at a second end of the housing side wall; a connecting flange on the exterior of the housing side wall and configured for removable attachment of the mechanical pressure sensor to an outer face of a concrete formwork panel; a pressure plate exposed to the open face of the outer sensor housing and positioned to contact concrete within a concrete formwork panel to which the mechanical pressure sensor is attached; a biasing member biasing the pressure plate toward the open face of the outer sensor housing; a cylindrical core affixed to the pressure plate and extending through an opening in the housing top wall; and a pressure scale on the cylindrical core positioned to indicate a hydrostatic pressure of concrete inside of a concrete formwork panel to which the mechanical pressure sensor is attached; and a concrete formwork panel having an opening in an outer face of the concrete formwork panel; wherein the mechanical pressure sensor is removably affixed to the outer face of the concrete formwork panel so that pressure plate is in fluid communication with concrete inside of the concrete formwork panel.

In accordance with still further aspects of an embodiment of the invention, a method is provided for in-situ measurement of fluid pressure during concrete material placement inside of a concrete formwork, comprising the steps of: providing a mechanical pressure sensor, the mechanical pressure sensor further comprising an outer sensor housing having a housing side wall having an interior side and an exterior side, a housing top wall at a first end of the housing side wall, and the housing side wall defining an open face at a second end of the housing side wall; a connecting flange on the exterior of the housing side wall and configured for removable attachment of the mechanical pressure sensor to an outer face of a concrete formwork panel; a pressure plate exposed to the open face of the outer sensor housing and positioned to contact concrete within a concrete formwork panel to which the mechanical pressure sensor is attached; a biasing member biasing the pressure plate toward the open face of the outer sensor housing; a cylindrical core affixed to the pressure plate and extending through an opening in the housing top wall; and a pressure scale on the cylindrical core positioned to indicate a hydrostatic pressure of concrete inside of a concrete formwork panel to which the mechanical pressure sensor is attached; removably affixing the mechanical pressure sensor to a concrete formwork panel having an opening in an outer face of the concrete formwork panel so that the pressure plate is in fluid communication with an interior of the concrete formwork panel; pouring liquid concrete into the concrete formwork; and measuring a fluid pressure of the concrete inside of the concrete formwork based on a position of the pressure scale with respect to the opening in the housing top wall of the mechanical pressure sensor.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENTS

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

The actual placement pressure for concrete is the main unknown for formwork design. Formwork pressure is difficult to characterize or accurately estimate due to several variables such as concrete mix design, placement rate and slump flow, among others. Form failures typically occur due to pressure overload and can lead to unstoppable leakage of the concrete paste or bursting failure of the formwork requiring that concrete placement be halted until the formwork is repaired.

Figure 1:
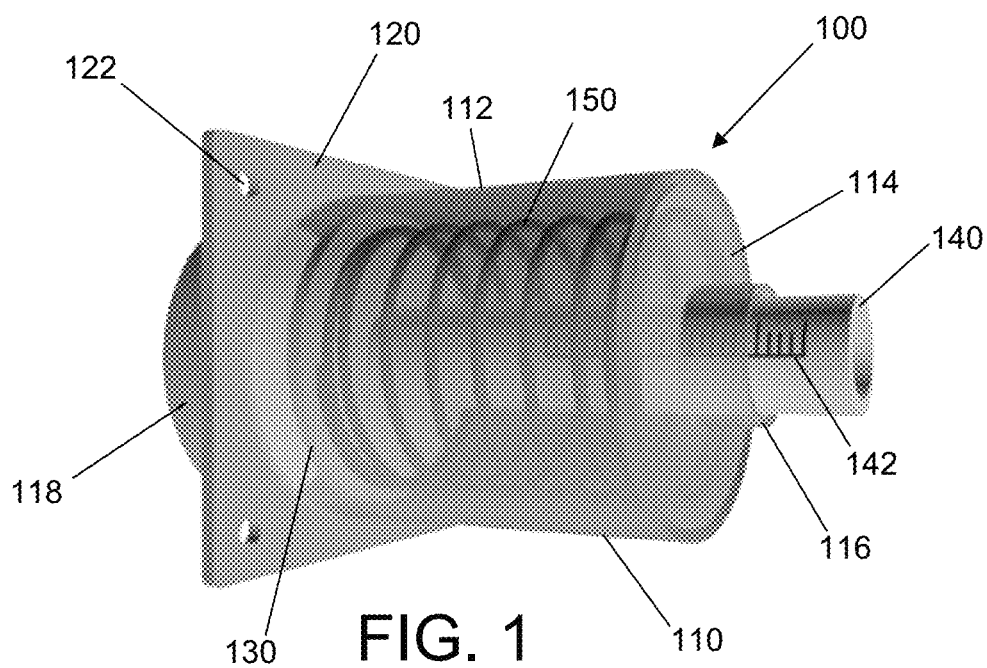
FIG. 1 shows a three-dimensional illustration of a device, partially in phantom, for in-situ measurement of concrete pressure inside of formwork in accordance with the present invention.
Figure 2:
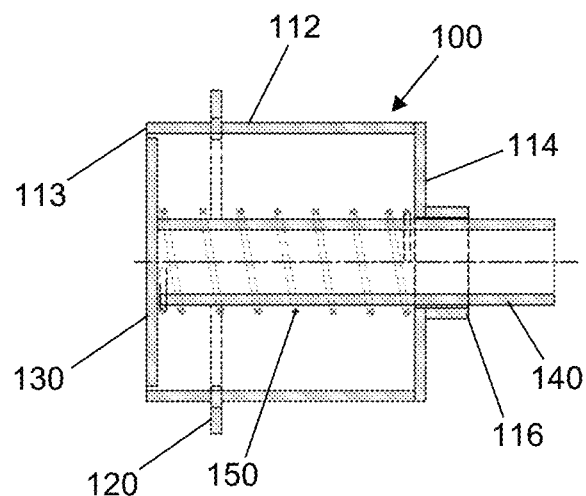
FIG. 2 is a cross-sectional view of the device of FIG. 1.
Figure 3:
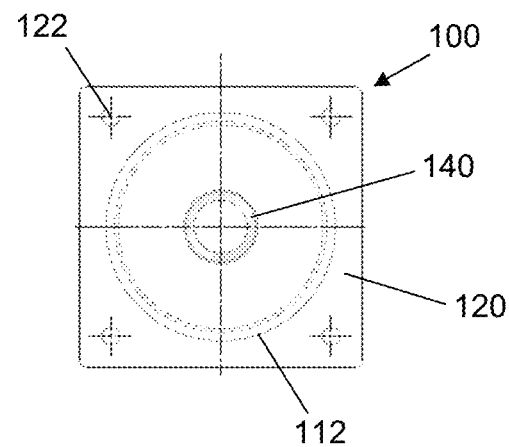
FIG. 3 is a top end view of the device of FIG. 1.

With reference to FIGS. 1 to 3, a mechanical pressure sensor 100 is provided that is configured for removable connection to and measurement of pressure inside of concrete formwork in accordance with certain aspects of an embodiment of the invention. Mechanical pressure sensor 100 includes an outer sensor housing 110, an interior pressure plate 130, a cylindrical core 140 attached to the interior pressure plate 130, and a biasing member 150. The foregoing are all of the elements of the mechanical pressure sensor 100, and thus define a simplistic and rugged but effective tool for the measurement of pressure experienced inside of a concrete structure, which sensor 100 is of sufficiently minimal and simplistic construction so as to allow easy installation, use, dismantling, and maintenance by construction personnel without the need for any specialized sensor training.

Outer sensor housing 110 includes a housing side wall 112 defining an open face 113 at an interior end of housing side wall 112, and a housing top wall 114 at an opposite, exterior end of housing side wall 112. Outer sensor housing 110 forms a pressure container that carries pressure plate 130 as it encounters concrete on an interior side of formwork to which sensor housing 110 is attached. More particularly, pressure plate 130 has an outer diameter that preferably closes matches at least a portion of the interior diameter of sensor housing 110 (i.e., that portion through which pressure plate 130 is intended to travel inside of sensor housing 110 during use), with that matching interior diameter of sensor housing 110 being of uniform dimension from the open face 113 of sensor housing 110 and along the interior side of housing side wall 112 through the entire intended length of travel of pressure plate 130. While sufficient tolerance should be provided between the outer perimeter of pressure plate 130 and the interior diameter of sensor housing 110 to allow for movement of pressure plate 130 therein, an O-ring 115 (FIGS. 4(a) and 4(b)) or similarly configured sealing member may be provided to ensure that concrete does not flow around the outer edges of pressure plate 130. To further guide pressure plate 130 through such movement inside of sensor housing 110, cylindrical core 140 is affixed to one side of pressure plate 130 (opposite the side facing open face 113 of sensor housing 110) and may extend outward from sensor housing 110 through housing top wall 114, and more particularly through an opening 116 in the housing top wall 114, which opening 116 is preferably centrally positioned in housing top wall 114.

Figure 4A:
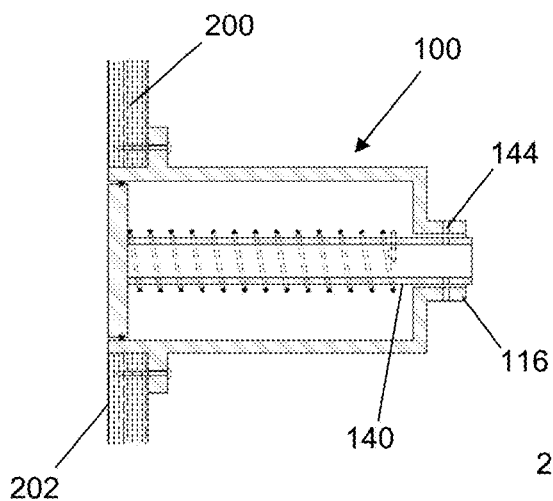
FIG. 4(a) is a cross-sectional view of the device of FIG. 1 attached to concrete formwork and in full extension prior to concrete pressure being applied.
Figure 4B:
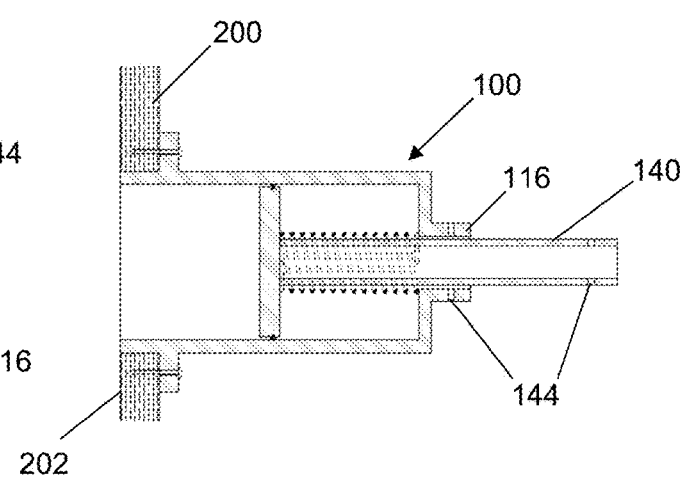
FIG. 4(b) is a cross-sectional view of the device of FIG. 1 attached to concrete formwork and compressed under pressure from concrete inside of the formwork.

In order to bring pressure plate 130 into contact with concrete inside of a concrete formwork construction, a connecting flange 120 is affixed to the outer side of housing side wall 112, and extends outward from the outer side of housing side wall generally parallel to open face 113 of housing side wall 112. Connecting flange 120 has preferably a plurality of openings 122 configured to removably receive connectors, such as (by way of non-limiting example) threaded connectors such as screws or bolts, thus allowing mechanical pressure sensor 100 to be removably affixed to the outer face of the formwork, with the interior face of connecting flange 120 sitting flush against the outer face of the formwork. Moreover, connecting flange 120 is preferably positioned a distance from open face 113 of housing side wall so as to, as best seen in FIGS. 4(a) and 4(b), cause the open face 113 of housing side wall 112 to sit flush with the interior side 202 of a formwork panel 200. Thus, when mechanical pressure sensor 100 is attached to a formwork panel, an interior portion 118 of sensor housing side wall 112 (which extends from flange 120 to open face 113) will extend through the full thickness of the formwork panel.

Biasing member 150 is positioned to bias pressure plate 130 towards open face 113 of sensor housing 110 (i.e., against the pressure exerted by concrete inside of formwork to which mechanical pressure sensor 100 has been attached). In certain configurations, biasing member 150 may comprise a coil spring positioned between the interior, top face of pressure plate 130 and housing top wall 114, although other biasing members may be employed without departing from the spirit and scope of the invention. Cylindrical core 140 preferably includes a visual pressure scale 142 printed on its outer surface at the end of cylindrical core 140 that extends through opening 116 in housing top wall 114. Biasing member 150 and pressure scale 142 are calibrated such that pressure scale 142 will indicate a concrete pressure inside of formwork to which mechanical pressure sensor 100 is attached. More particularly, pressure scale 142 will move with respect to opening 116 in housing top wall 114 as the concrete pressure inside of the formwork varies, such that a worker may readily view and monitor current pressure inside of the formwork simply by reading the point on pressure scale 142 that aligns with the opening 116 in housing top wall 114. FIG. 4(a) shows mechanical pressure sensor 100 joined to concrete formwork panel 200 before concrete has come into contact with pressure sensor 100 and it thus in a fully extended position, while FIG. 4(b) shows mechanical pressure sensor 100 after concrete has been added to the concrete formwork construction and is thus in a compressed state.

Optionally, in order to keep pressure plate aligned with open face 113 of sensor housing 110 until concrete has been introduced into the concrete formwork construction, bore holes may be provided through cylindrical core 140 and opening 116 in housing top wall 114, which bore holes may receive a pin or similar structure that may be removed when it is desired to measure the pressure inside of the formwork construction.

In user, the mechanical pressure sensor 100 may be removably attached to a formwork panel at a location where an opening has been provided to receive interior portion 118 of housing side wall 112, and removably affixed to the formwork panel (with flange 120 sitting flush against the outer surface of the formwork panel) vie screws, bolts, or similarly configured connectors. Once concrete has been poured into the formwork construction and it is desired to measure and/or monitor the concrete pressure inside of the formwork, a pin (if any) may be removed from bore holes 144, allowing pressure plate 130 to then move inside of sensor housing 110 under the influence of the concrete pressure, and against the bias exerted by biasing member 150. Once such movement has stopped, a worker may simply align the end of opening 116 in housing top wall 114 with pressure scale 142 in order to obtain a current measure of the hydrostatic concrete pressure inside of the formwork construction at the location of the mechanical pressure sensor 100.

While existing methods of concrete pressure determination are based on using electrical components the require power supply, wiring, and read out devices or computers to translate the electrical signal into an equivalent pressure measurement, the foregoing mechanical pressure sensor and method of its use significantly simplify both the construction and method of obtaining such measurements. The prior methods of pressure measurement suffer from the drawback that they are expensive, can easily be damaged during construction operations, cannot be handled by the average construction worker, and must be operated by individuals certified to use the equipment, while the construction discussed above is both rugged but likewise sufficiently simply in assembly and operation so as to enable its use and maintenance without requiring specialized skills.

A method according to certain aspects of an embodiment of the invention is likewise characterized in that it is rugged, is mechanical in nature, does not require a power supply, is inexpensive, is optionally disposable, and can easily be operated by the average construction worker.

A device configured in accordance with aspects of the invention can be fabricated with any dimensions to accommodate a suitable spring or similar biasing member as discussed above. The mechanical pressure sensor 100 can expediently be assembled and attached to formwork. When pressure plate 130 is subjected to concrete pressure, it creates a force on the biasing member 150 that is proportional to the pressure of the concrete. The biasing member 150 will then compress under plate pressure proportional to the applied force, and the cylindrical core 140 extending outward through opening 116 of housing top wall 114 will proportionally indicate the magnitude of the concrete pressure.

Systems and methods employing the foregoing exemplary embodiment may provide one or more of the following advantages over previously known systems and methods for measuring pressure during concrete placement:
- improve the safety of construction during concrete placement;
- minimize the potential for formwork failure due to pressure overload;
- use of a mechanical displacement-controlled procedure, which is a significantly more reliable technique for monitoring the concrete formwork pressure;
- allowing the attachment of the device to formwork with the face of the sensor flush with the inside face of the formwork;
- allowing mounting on horizontal or vertical surfaces to measure fresh or liquid concrete pressure;
- allowing usage one or multiple times (disposable);
- avoiding the need for re-calibration;
- cost effective;
- avoiding the need for extensive training or certification; and
- avoiding the requirement for a power supply or read out devices.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A mechanical pressure sensor configured for in-situ measurement of hydrostatic pressure inside of a concrete formwork panel having an interior wall in contact with curing concrete, the mechanical pressure sensor consisting essentially of:
   an outer sensor housing having a housing side wall having an interior side and an exterior side, a housing top wall at a first end of said housing side wall, and said housing side wall defining an open face at a second end of said housing side wall;

a connecting flange on the exterior the housing side wall and configured for removable attachment of the mechanical pressure sensor to an outer face of the concrete formwork panel, the connecting flange being positioned with respect to the open face of said outer sensor housing so as to position said open face flush with said formwork panel interior wall;

a pressure plate having a diameter matching a diameter of said open face of said outer sensor housing and positioned to contact concrete at said open face and within the concrete formwork panel to which said mechanical pressure sensor is attached;

a biasing member biasing said pressure plate toward said open face of said outer sensor housing;

a cylindrical core affixed to said pressure plate and extending through an opening in said housing top wall; and a pressure scale on said cylindrical core positioned to indicate a hydrostatic pressure of concrete inside of the concrete formwork panel to which said mechanical pressure sensor is attached.

2. The mechanical pressure sensor of claim 1, wherein said biasing member is calibrated to cause said pressure scale to indicate said hydrostatic pressure of concrete at a point on said pressure scale that aligns with said opening in said housing top wall.

3. The mechanical pressure sensor of claim 1, wherein at least a portion of said interior side of said housing side wall has a uniform diameter extending from said open face of said outer sensor housing into said outer sensor housing for a distance equal to a complete path of travel of said pressure plate inside of said outer sensor housing.

4. The mechanical pressure sensor of claim 3, wherein an outer-most perimeter of said pressure plate is in contact with said interior side of said portion of said housing side wall having a uniform diameter.

5. The mechanical pressure sensor of claim 1, wherein said connecting flange extends outward from said exterior side of said housing side wall and parallel to said open face of said outer sensor housing.

6. A system for in-situ measurement of hydrostatic pressure inside of a concrete formwork panel, comprising:

a concrete formwork panel having an opening in an outer face of said concrete formwork panel and an interior wall in contact with curing concrete; and a mechanical pressure sensor, said mechanical pressure sensor further comprising:

an outer sensor housing having a housing side wall having an interior side and an exterior side, a housing top wall at a first end of said housing side wall, and said housing side wall defining an open face at a second end of said housing side wall;

a connecting flange on the exterior of the housing side wall and configured for removable attachment of the mechanical pressure sensor to an outer face of concrete formwork panel, the connecting flange being positioned with respect to the open face of said outer sensor housing so as to position said open face flush with said formwork panel interior wall;

a pressure plate having a diameter matching a diameter of said open face of said outer sensor housing and positioned to contact concrete at said open face and within the concrete formwork panel to which said mechanical pressure sensor is attached;

a biasing member biasing said pressure plate toward said open face of said outer sensor housing;

a cylindrical core affixed to said pressure plate and extending through an opening in said housing top wall; and a pressure scale on said cylindrical core positioned to indicate a hydrostatic pressure of concrete inside of the concrete formwork panel to which said mechanical pressure sensor is attached;

wherein said mechanical pressure sensor is removably affixed to said outer face of said concrete formwork panel so that an entire outer face of said pressure plate is in fluid communication with concrete at said open face and inside of said concrete formwork panel.

7. The system of claim 6, wherein a portion of said housing side wall extends through an outer wall of said concrete formwork panel so that said open face of said outer sensor housing is aligned with an interior side of said outer wall of said concrete formwork panel.

8. The system of claim 7, wherein said connecting flange sits flush against an exterior side of said outer wall of said concrete formwork panel.

9. The system of claim 8, said connecting flange having a plurality of openings, the system further comprising a plurality of threaded connectors extending through said openings and removably affixing said mechanical pressure sensor to said concrete formwork panel.

10. The system of claim 6, wherein said biasing member is calibrated to cause said pressure scale to indicate said hydrostatic pressure of concrete inside of said concrete formwork panel at a point on said pressure scale that aligns with said opening in said housing top wall.

11. The system of claim 6, wherein at least a portion of said interior side of said housing side wall has a uniform diameter extending from said open face of said outer sensor housing into said outer sensor housing for a distance equal to a complete path of travel of said pressure plate inside of said outer sensor housing.

12. The system of claim 11, wherein an outer-most perimeter of said pressure plate is in contact with said interior side of said portion of said housing side wall having a uniform diameter.

13. The system of claim 6, wherein said connecting flange extends outward from said exterior side of said housing side wall and parallel to said open face of said outer sensor housing.

14. A method for in-situ measurement of hydrostatic pressure during concrete material placement inside of a concrete formwork panel having an interior wall in contact with curing concrete, comprising the steps of:

providing a mechanical pressure sensor, said mechanical pressure sensor further comprising:

an outer sensor housing having a housing side wall having an interior side and an exterior side, a housing top wall at a first end of said housing side wall, and said housing side wall defining an open face at a second end of said housing side wall;

a connecting flange on the exterior of the housing side wall and configured for removable attachment of the mechanical pressure sensor to an outer face of the concrete formwork panel, the connecting flange being positioned with respect to the open face of said outer sensor housing so as to position said open face flush with said formwork panel interior wall;

a pressure plate having a diameter matching a diameter of said open face of said outer sensor housing and positioned to contact concrete at said open face and within the concrete formwork panel to which said mechanical pressure sensor is attached;

a biasing member biasing said pressure plate toward said open face of said outer sensor housing;

a cylindrical core affixed to said pressure plate and extending through an opening in said housing top wall; and a pressure scale on said cylindrical core positioned to indicate a hydrostatic pressure of concrete inside of the concrete formwork panel to which said mechanical pressure sensor is attached;

removably affixing said mechanical pressure sensor to the concrete formwork panel having an opening in an outer face of said concrete formwork panel so that pressure plate is in fluid communication with an interior of said concrete formwork panel;

pouring liquid concrete into said concrete formwork; and measuring a fluid pressure of said concrete inside of said concrete formwork based on a position of said pressure scale with respect to said opening in said housing top wall of said mechanical pressure sensor.

15. The method of claim 14, wherein a portion of said housing side wall extends through an outer wall of said concrete formwork panel so that said open face of said outer sensor housing is aligned with an interior side of said outer wall of said concrete formwork panel.

16. The method of claim 15, wherein said connecting flange is positioned flush against an exterior side of said outer wall of said concrete formwork panel.

17. The method of claim 16, said connecting flange having a plurality of openings, the method further comprising placing a plurality of threaded connectors through said openings to removably affix said mechanical pressure sensor to said concrete formwork panel.

18. The method of claim 14, wherein said biasing member is calibrated to cause said pressure scale to indicate said hydrostatic pressure of concrete inside of said concrete formwork panel at a point on said pressure scale that aligns with said opening in said housing top wall.

19. The method of claim 14, wherein at least a portion of said interior side of said housing side wall has a uniform diameter extending from said open face of said outer sensor housing into said outer sensor housing for a distance equal to a complete path of travel of said pressure plate inside of said outer sensor housing.

20. The system of claim 19, wherein an outer-most perimeter of said pressure plate is in contact with said interior side of said portion of said housing side wall having a uniform diameter.

\* \* \* \* \*